United States Patent [19]

Amato

[11] Patent Number: 4,881,864
[45] Date of Patent: Nov. 21, 1989

[54] BOOM HOIST FOR ATTACHMENT TO A TRAILER HITCH DRAWBAR

[75] Inventor: Joseph G. Amato, Brighton, Colo.

[73] Assignee: Hitch Lift, Inc., Brighton, Colo.

[21] Appl. No.: 118,563

[22] Filed: Nov. 9, 1987

[51] Int. Cl.⁴ .................................................. B60R 9/00
[52] U.S. Cl. ..................................... 414/543; 414/562; 280/415.1; 254/323; 212/244; 212/254
[58] Field of Search ................. 212/244, 254; 414/539, 414/540, 541, 542, 543; 280/415 R; 224/42.03 R, 42.41; 254/323

[56] References Cited

U.S. PATENT DOCUMENTS

| | | | |
|---|---|---|---|
| 2,509,950 | 5/1950 | Zierke | 414/543 |
| 2,661,854 | 12/1953 | Adams | 414/543 |
| 3,784,035 | 1/1974 | Dunbar | 414/543 |
| 3,804,263 | 4/1974 | Castonguay | 414/543 X |
| 3,836,024 | 9/1974 | Mantino | 414/543 |
| 3,952,893 | 4/1976 | Kolesar | 414/543 X |
| 4,635,835 | 1/1987 | Cole | 414/462 X |
| 4,738,581 | 4/1988 | Kuhlman | 414/462 |

FOREIGN PATENT DOCUMENTS 308381 2/1969 Sweden .............................. 414/543

Primary Examiner—Frank E. Werner
Attorney, Agent, or Firm—Terry M. Gernstein

[57] ABSTRACT

A swingable boom-type hoist is disclosed which is characterized by a forwardly-projecting tongue of rectangular cross section that telescopes into the box-beam style drawbar of a conventional trailer hitch carried by the load-carrying vehicle thus cooperating therewith to maintain the stanchion from which the tongue projects in an upright position. The boom on the upper end of the stanchion can swing through a complete circle and is preferably vertically adjustable. An important feature is the retractable foot on the lower end of the stanchion which can be raised off the ground while the load in the load-carrying vehicle is transported from one place to another without having to dismount the hoist. A conventional winch is used to raise and lower the load.

9 Claims, 2 Drawing Sheets

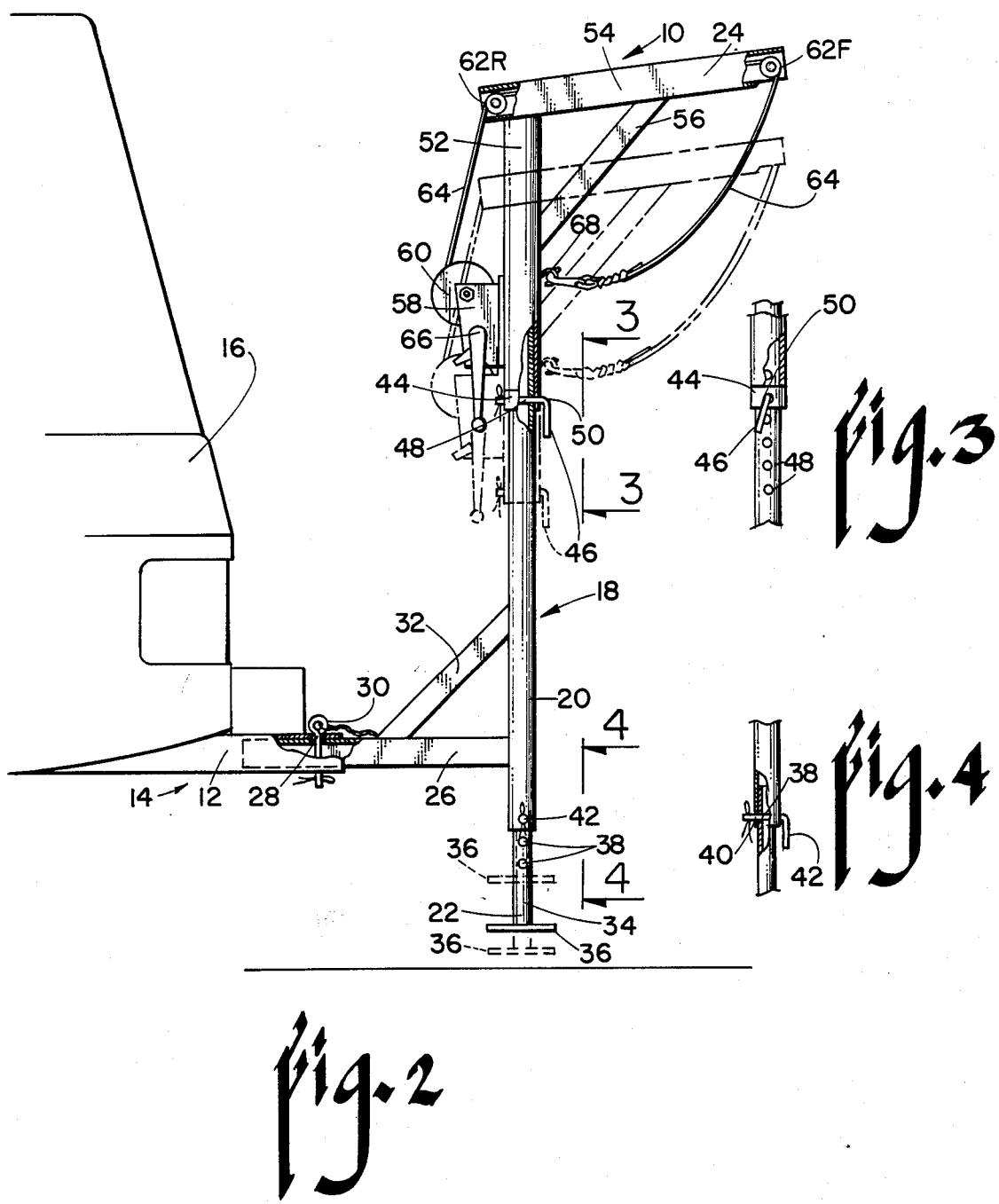

BOOM HOIST FOR ATTACHMENT TO A TRAILER HITCH DRAWBAR

BACKGROUND OF THE INVENTION

Homeowners, shopkeepers and small manufacturing operations all have a need occasionally to lift a box or piece of equipment into the bed of a pickup or the back of a station wagon that is too heavy to be lifted by hand. Of course, trucks equipped with hydraulically-operated lift gates accomplish this purpose quite satisfactorily but small businesses and individuals can seldom justify the expense of such a truck when the need therefor is sporadic. Also, these units require that the load be transferred from the gate to the bed and back again to be unloaded. Most hoists, for that matter, do not remain with the load-transporting vehicle and, therefore, some transfer of the load from the hoist must, of necessity, take place.

FIELD OF THE INVENTION

The present invention relates to a boom-type hoist which mounts on the trailer hitch drawbar of the load-carrying vehicle and remains with the latter still attached to the load while it is being transported.

DESCRIPTION OF THE RELATED ART

The prior art is replete with jacks of one type or another associated with a load-carrying vehicle or trailer. Examples will be found in the Wagner U.S. Pat. No. 2,638,315; Weiss U.S. Pat. No. 3,022,043; Mulholland et al U.S. Pat. No. 3,033,523; Wetter U.S. Pat. No. 3,086,752; Hafell U.S. Pat. No. 3,580,543 and Douglas U.S. Pat. No. 3,595,527. Another class of vehicle-mounted hoists are the liftgates like those shown in Davy et al U.S. Pat. No. 4,405,279 and Robson U.S. Pat. No. 4,456,421. Some, like Moody U.S. Pat. No. 2,982,431 and McIntire U.S. Pat. No. 3,720,358 even include ground-engaging feet.

Boom-type hoists are also commonly associated with load-carrying vehicles and trailers as exemplified by the Babson U.S. Pat. No. 2,131,133; Fujioka U.S. Pat. No. 3,578,179; Wardlaw U.S. Pat. No. 3,899,089; Paffrath U.S. Pat. No. 4,391,379 and Harlan U.S. Pat. No. 4,556,358. The Pentergraft U.S. Pat. No. 4,391,379 even shows a boom-type hoist associated with retractable ground-engaging feet as does the Adeline U.S. Pat. No. 4,417,665. A drawbar-mounted jack known is shown in the Foster U.S. Pat. No. 4,202,528; however, it lacks a boom and could not be used to hoist and swing a load into the load-carrying vehicle.

SUMMARY OF THE INVENTION

The present invention features an upright stanchion atop which is mounted a swingable boom. A winch mounted on the swingable upper section of the stanchion for movement therewith has its hoisting cable reaved over a pulley out at the end of the boom. A tongue projects forwardly from the stanchion for detachable connection to a box-beam type drawbar of a common trailer hitch. A telescopable foot on the lower end of the stanchion can be raised up to clear the ground while the load is being transported. Since the hoist goes with the load, there is no necessity for it to be disconnected from the hoist cable although it is, preferably, lowered down to rest in the bed of the transporting vehicle while the latter is moving.

It is, therefore, the principal object of the present invention to provide a novel and improved boom-type hoist for use with a load-carrying vehicle equipped with a box-beam type drawbar.

A second object of the invention is to provide a device of the type aforementioned in which the stanchion can be lifted free of the ground while remaining attached to the drawbar for movement with the load-carrying vehicle.

Another objective of the invention herein disclosed and claimed is that of providing a vehicle-mounted hoist which can be adjusted to rest upon the ground when under load thus stabilizing the latter while it is being lifted and, at the same time, preventing the springs from being overloaded.

Still another object of the within-described invention is to provide a boom-type hoist having a forwardly-extending tongue that cooperates upon insertion into a box-beam type drawbar to maintain the stanchion in upright position even when the foot is raised free of the ground.

An additional object of the invention forming the subject matter hereof is the provision of a hoisting apparatus that requires no alteration of the load-carrying vehicle provided it is equipped with a box-beam drawbar as a part of its hitch mechanism.

Further objects are to provide a carry-along hoist for station wagons, pickup trucks and the like which is simple to operate, safe, rugged, easy to mount and remove, versatile, compact, lightweight yet strong and even somewhat decorative.

Other objects will be in part apparent and in part pointed out specifically hereinafter in connection with the drawings that follow.

BRIEF DESCRIPTION OF THE DRAWINGS

FIG. 2 is also a fragmentary side elevation to the same scale as FIG. 1 showing the adjustable foot and adjustable collar forming parts of the stanchion subassembly, portions having been broken away and shown in section;

FIG. 3 is a fragmentary rear elevation taken along line 3—3 of FIG. 2 to the same scale as FIGS. 1 and 2, portions of which have been broken away to more clearly reveal the interior construction; and, FIG. 4 is a fragmentary rear elevation taken along line 4—4 of FIG. 2, once again, to the same scale as the other figures, portions having been broken away and shown in section.

DESCRIPTION OF THE PREFERRED EMBODIMENT

Figure 1:
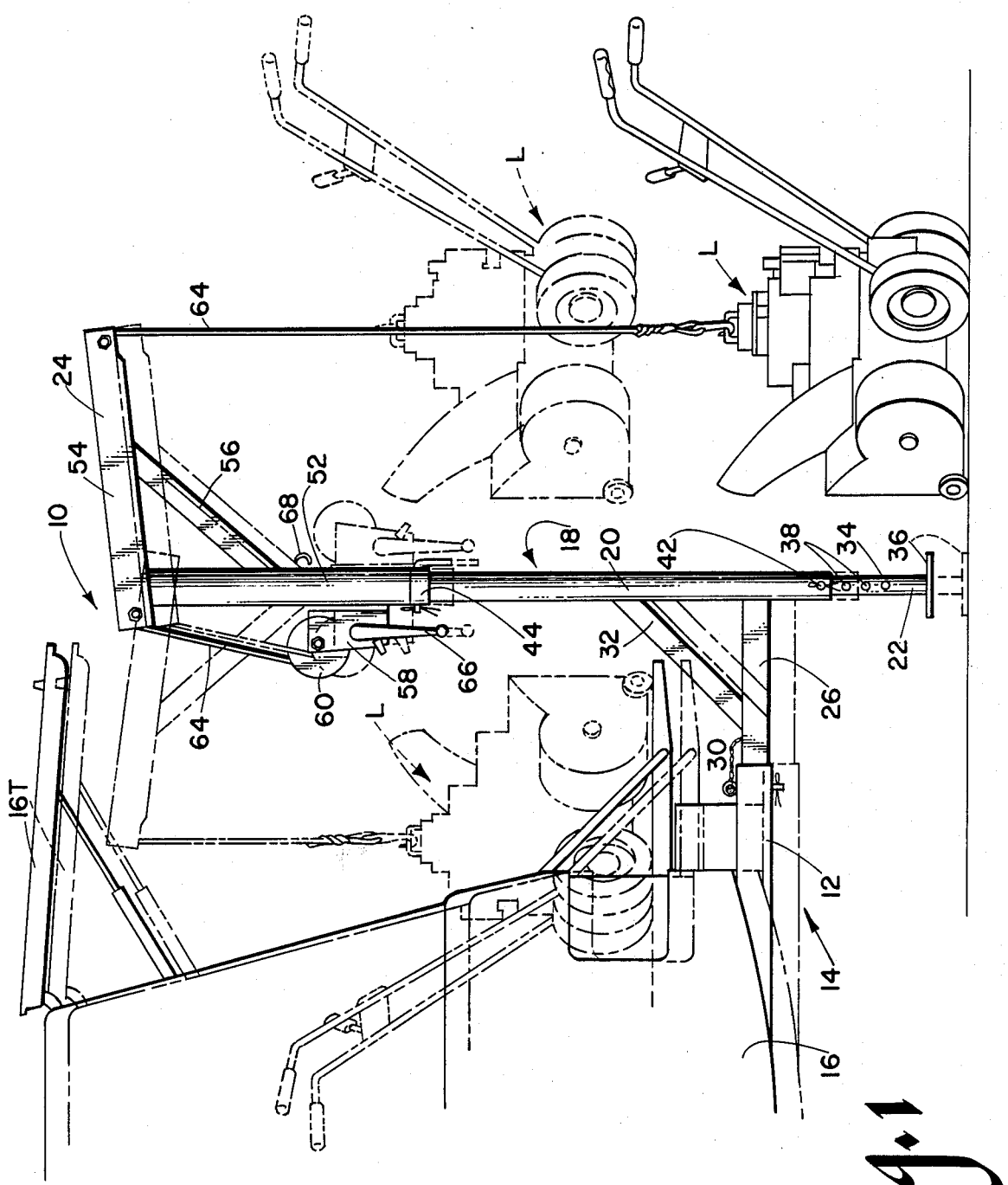
FIG. 1 is a fragmentary side elevation showing the boom-type hoist of the present invention mounted on the drawbar of a trailer hitch attached to a station wagon with the load, a snowblower, together with other elements of the assembly having been represented in both full and phantom lines in their various positions.

Referring to the drawings for a detailed description of the present invention, reference numeral 10 has been selected to designate the hoist in a general way and it will be seen attached to and carried by the box-beam type drawbar 12 of a conventional trailer hitch that has been broadly identified by reference numeral 14. In the particular form shown, the drawbar will be seen attached to the undercarriage of a station wagon 16 which comprises the load-carrying vehicle. A station wagon has been chosen to illustrate the invention in preference to a pickup truck or the like because the adjustable height stanchion subassembly that has been broadly indicated by reference numeral 18 is especially useful in this connection as will be explained in greater detail presently.

Stanchion subassembly 18 includes a tubular stanchion 20 into the lower end of which is telescoped an adjustable foot 22. A swingable boom 24 is similarly telescoped onto its upper end. A tongue 26 projects forwardly from the stanchion at a point just above its lower end as shown. This tongue has a rectangular cross-section sized to enter the box beam in the manner shown and cooperate therewith to maintain the subassembly in upright position. The box-beam and tongue are provided with registering apertures 28 which receive a latch pin 30 that maintains them in assembled relation. An angled brace 32 is shown extending from the stanchion down to the tongue.

With particular reference to FIGS. 1, 2 and 4. it can be seen that adjustable foot 22 includes a tubular member 34 having a baseplate 36 at its lower end. Tube 34 is provided with a series of apertures 38 which can be placed in registry with an aperture 40 in the lower end of tube 20 so as to receive a latch pin 42 thereby allowing the height of the baseplate above the ground to be adjusted for a purpose which will be described in detail presently.

In FIGS. 1, 2 and 3, it can be seen that the stanchion 20 is encircled by a collar 44 which, like the tongue 26 and the foot 22, is adjustably pinned by means of latch pin 46 that passes through on the apertures 48 in the stanchion and a registering one 50 in the collar. Resting atop this collar telescoped down over the stanchion is a sleeve 52 carrying at its upper end a laterally-extending boom 54. Angled brace 56 provides support for the boom in the conventional manner. Sleeve 54 is free to rotate around the stanchion supported upon collar 44 so as to occupy its various full-line and phantom-line positions shown in FIGS. 1 and 2. By adjusting the height of the collar on the stanchion as seen in FIG. 2, the boom can be raised and lowered. This feature becomes especially useful when placing a load L into a covered vehicle like the station wagon 16 because the boom is free to swing in underneath the tailgate 16T when the latter is raised in the manner shown in FIG. 1. Of course, when loading load L into an open-topped pickup truck bed or the like, it may be necessary to raise the boom to the top of the stanchion so that the load will clear the tailgate if left closed.

Welded or otherwise attached to sleeve 52 for swingable movement therewith around the stanchion is a winch-support bracket 58 carrying a winch 60 of conventional design that requires no further description. As seen in FIG. 2, the boom comprises a box-beam open at both ends which is provided with pulleys 62R and 62F over which the winch cable 64 is reaved in the usual manner. Winch handle 66 is used to manually lift and lower the load L as shown, however, it is obvious that electrically or hydraulically-powered winches could be substituted for the one shown.

The manner of using the hoist is best described in connection with FIGS. 1 and 2. Starting with FIG. 2, with the hoist set up as shown in full-line position, it is mounted on the load-carrying vehicle 16 by inserting its tongue into the hitch drawbar and inserting the latch pin 30. Assuming the load L is close at hand, there is probably no reason to have to raise the foot 22 into the upper of its phantom-line positions. If, on the other hand, the load is some distance away, the user has the choice of mounting the hoist as shown and raising the foot into the upper of its phantom-line positions or, alternatively, placing it in the back of the vehicle to be mounted later. Raising the foot is a good practice when moving from place-to-place or it may get "hung up" on high spots in the roadway.

When loading into a station wagon or other covered vehicle like that shown, the height of the boom must be adjusted before the load is picked up for obvious reasons. As illustrated it needed to be dropped down from its full-line into its phantom-line position in order to clear the tailgate 16T. Equally, if not more important, is the adjustment of the foot 22. If, for example, the load is a light one that is not going to overload the springs of the load-carrying vehicle, then the best idea is to leave the foot raised well up off the ground since its support is not needed. On the other hand, in most instances the load will be a heavy one which not only might overload the spring system but in some instances could even tip the vehicle backwards and raise the front wheels off the ground. Therefore, it is important to lower the foot into the phantom-line position shown in FIG. 2, an inch or two off the ground. Then, when the load is picked up as shown in FIG. 1, it will cause the entire assembly to drop down from the full-line into the phantom-line position such that the baseplate rests on the ground and the load on the springs is limited to that which they can readily withstand without damage. If this is properly done, when the load is swung forwardly from its rearmost phantom-line position shown in FIG. 1 forwardly onto the the bed of the load-carrying vehicle, the pressure on the baseplate should be relieved to the point where pin 42 can be pulled out and the foot raised up. On the rare occasion where the foot cannot be released, it is only necessary to set the load down again, raise the foot up another hole or so and repeat the process. In any event, when transporting the load, the foot must be raised up off the ground as previously noted.

Now, by reason of the fact that the hoist stays with the load, it need not be disconnected from the latter although the winch cable should be slacked off so that the vehicle, not the hoist, is carrying it. Obviously, the cable can be disconnected from the load and stowed as shown in FIG. 2 on hook 68 provided for this purpose on the collar 52. Loads far too heavy to be lifted by hand can thus be accommodated safely and easily. Also, by reason of the fact that the hoist uses the drawbar of a conventional trailer hitch, it becomes very versatile and can be used on a wide variety of load-carrying vehicles without their having to be modified in any respect whatsoever.

What is claimed is:

1. For use with a load-carrying vehicle equipped with a hollow rectangular drawbar extending rearwardly therefrom as part of a hitch, the boom-type hoist which comprises: a rigid tubular stanchion; a rectangular tongue projecting forwardly from said stanchion intermediate the ends thereof for telescopic engagement with the drawbar, said tongue when so engaged cooperating with the drawbar to maintain the stanchion in an upright position with the lower end thereof raised off the ground; means detachably interconnecting said tongue and drawbar in telescoped relation; means comprising a retractable foot telescoped into the lower end of the stanchion for movement between an extended ground-engaging position supporting the stanchion together with any load carried thereby and a retracted position elevated clear of the ground; a collar mounted on said stanchion, said collar having a top surface; a sleeve telescopingly receiving said stanchion and being movable axially of said stanchion, said sleeve having an upper end and a lower end with said sleeve lower end resting on top of said collar top surface to be supported thereby on the upper end of the stanchion for relative rotational movement; a rigid arm projecting from said sleeve upper end and cooperating therewith to define a rotatable boom having a remote end; and winch means having a cable wound thereon mounted on the sleeve for rotational movement therewith, said winch cable having a portion thereof reaved along the boom and over its remote end into position for attachment to a load, said elements cooperating with one another to define a hoist for raising a load off the ground and swinging it into the load-carrying vehicle, and said foot in retracted position permitting the load-carrying vehicle and any load carried therein to be transported from place to place while the hoist remains attached to the latter.

2. The boom-type hoist as set forth in claim 1 in which: attaching means are provided on the stanchion for attaching the collar to said stanchion at various heights thereon, said attaching means including stanchion apertures defined in the stanchion and collar apertures defined in said collar and being alignable with said stanchion apertures, and a latch pin which fits through said aligned stanchion collar apertures.

3. The boom-type hoist as set forth in claim 2 in which: the collar is slidable along the stanchion.

4. The boom-type hoist as set forth in claim 1 in which: the boom includes a pulley on its remote end over which the winch cable is reaved.

5. The boom-type hoist as set forth in claim 4 in which: the boom has pulleys at both ends thereof over which the winch cable is reaved.

6. The boom-type hoist as set forth in claim 1 which includes: means for releasably latching the foot in selected elevated positions relative to the stanchion.

7. The boom-type hoist as set forth in claim 1 in which: the stanchion includes a series of vertically-spaced apertures in its upper end; and, in which means for supporting said sleeve in selected elevated positions is detachably connected into one of said apertures.

8. The boom-type hoist as set forth in claim 7 in which: the apertures are arranged in diametrically-aligned pairs and the means for supporting said sleeve includes a latch pin extending therebetween.

9. The boom-type hoist as set forth in claim 8 in which: the sleeve-supporting means includes a collar encircling the stanchion, said collar having at least one latch pin-receiving aperture therein.

* * * * *